United States Patent
Ueda et al.

(10) Patent No.: US 9,376,103 B2
(45) Date of Patent: Jun. 28, 2016

(54) TRAVELING MODE SWITCHING CONTROLLER OF HYBRID ELECTRIC VEHICLE

(71) Applicant: MITSUBISHI JIDOSHA KOGYO KABUSHIKI KAISHA, Tokyo (JP)

(72) Inventors: Katsunori Ueda, Okazaki (JP); Yusuke Sasaki, Okazaki (JP); Shigetoshi Hirano, Toyoake (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 81 days.

(21) Appl. No.: 14/137,303

(22) Filed: Dec. 20, 2013

(65) Prior Publication Data
US 2014/0180516 A1 Jun. 26, 2014

(30) Foreign Application Priority Data
Dec. 21, 2012 (JP) .................................. 2012-279311

(51) Int. Cl.
*B60K 6/442* (2007.10)
*B60W 20/20* (2016.01)
(Continued)

(52) U.S. Cl.
CPC ................ *B60W 20/20* (2013.01); *B60K 6/442* (2013.01); *B60K 6/52* (2013.01); *B60W 10/02* (2013.01);
(Continued)

(58) Field of Classification Search
CPC .... B60K 6/405; B60K 6/485; F16H 57/0421; Y02T 10/6226; Y10S 903/946; B60W 20/20; B60W 20/40
See application file for complete search history.

(56) References Cited

U.S. PATENT DOCUMENTS 7,845,444 B2 * 12/2010 Kidokoro et al. ........ 180/65.235
2004/0044458 A1 3/2004 Kadota
(Continued)

FOREIGN PATENT DOCUMENTS

CN 1496888 A 5/2004
EP 2 439 094 A1 4/2012
(Continued)

OTHER PUBLICATIONS

Russian Office Action dated Mar. 20, 2015 issued in the corresponding Russian Application No. 2013156856/11(088644) with an English Translation.
(Continued)

*Primary Examiner* — Jerrah Edwards
*Assistant Examiner* — Aaron Smith
(74) *Attorney, Agent, or Firm* — Birch, Stewart, Kolasch & Birch, LLP

(57) ABSTRACT

A traveling mode switching controller of a hybrid electric vehicle has a velocity detection unit, a state-of-charge detection unit, and a switching control unit for selectively switching among first to third traveling modes. In the first traveling mode, an engine is deactivated and a drive motor is activated to actuate drive wheels. In the second traveling mode, the engine activates a generator to activate the drive motor. In the third traveling mode, the engine activates the drive wheels. When the state of charge is less than a first state of charge, the switching control unit performs switching between the second traveling mode and the third traveling mode at a first velocity. When the state of charge is the first state of charge or more, the switching control unit performs switching between the first traveling mode and the third traveling mode at a predetermined velocity higher than the first velocity.

5 Claims, 3 Drawing Sheets

(51) Int. Cl.
*B60W 10/08* (2006.01)
*B60W 20/00* (2016.01)
*B60W 10/02* (2006.01)
*B60W 10/06* (2006.01)
*B60W 10/26* (2006.01)
*B60K 6/52* (2007.10)

(52) U.S. Cl.
CPC ............... *B60W 10/06* (2013.01); *B60W 10/08* (2013.01); *B60W 10/26* (2013.01); *B60W 2510/244* (2013.01); *B60W 2520/10* (2013.01); *B60W 2540/10* (2013.01); *Y02T 10/6234* (2013.01); *Y02T 10/6265* (2013.01); *Y02T 10/6286* (2013.01); *Y10S 903/93* (2013.01)

(56) References Cited

U.S. PATENT DOCUMENTS

| | | | |
|---|---|---|---|
| 2008/0076616 A1 | 3/2008 | Kidokoro et al. | |
| 2012/0089284 A1 | 4/2012 | Nissato | |
| 2013/0030638 A1 | 1/2013 | Nissato | |
| 2013/0166118 A1* | 6/2013 | Kim | 701/22 |
| 2014/0121867 A1* | 5/2014 | Tamai | B60W 10/06 701/22 |

FOREIGN PATENT DOCUMENTS

| | | | |
|---|---|---|---|
| FR | 2931427 A1 | | 11/2009 |
| JP | 2011156985 A | * | 8/2011 |
| JP | 2011-225034 A | | 11/2011 |
| WO | WO 2011/092390 A1 | | 8/2011 |
| WO | WO 2011/129196 A1 | | 10/2011 |

OTHER PUBLICATIONS

European Search Report issued Apr. 28, 2014 for Application No. EP 13 19 8272.

* cited by examiner

TRAVELING MODE SWITCHING CONTROLLER OF HYBRID ELECTRIC VEHICLE

BACKGROUND

The invention relates to a technique for controlling switching of a traveling mode of a hybrid electric vehicle.

Of recently-developed hybrid electric vehicles, some vehicles are known as being able to switch among an EV mode in which the vehicle travels by means of drive motors (electric motors) and by use of electric power fed from a drive battery without activating an engine, a series mode in which the vehicle travels by means of the electric motors while generating electric power by causing the engine to actuate a generator, and a parallel mode in which the vehicle travels by means of both the engine and the electric motors.

In a hybrid electric vehicle capable of traveling in a parallel mode, driving force can be transmitted from the engine to drive shafts by way of a transmission and a clutch. In the parallel mode, the clutch is connected, and gear-shifting of the transmission is controlled to transmit the driving force to drive wheels.

Patent Document 1 discloses a hybrid electric vehicle capable of automatically switching among the EV mode, the series mode, and the parallel mode in accordance with a state of charge of a drive battery and a traveling velocity.

Patent Document 1 also discloses a technique of implementing switching of the mode to the parallel mode when the state of charge of the battery has anomalously fallen for reasons of a failure of the generator, or the like, to thus enable the vehicle to travel in emergency.

[Patent Document 1] International Publication No. WO-2011-129196

SUMMARY

Patent Document 1 discloses a proposal pertinent to control of switching of the mode the parallel mode in the unusual situation, like a failure of the generator. However, appropriate switching of the traveling mode is desired not only in such an unusual situation but also in a normal situation. In particular, the hybrid electric vehicle capable of traveling in the parallel mode is required to enhance fuel consumption by appropriate switching of the traveling mode.

The invention has been conceived to solve the problem and aims at providing a traveling mode switching controller of a hybrid electric vehicle that can travel in a parallel mode and enhance fuel consumption by appropriately switching a traveling mode.

In order to accomplish the objective, there is provided a traveling mode switching controller of a hybrid electric vehicle, comprising:
  a velocity detection unit for detecting a traveling velocity of a vehicle;
  a state-of-charge detection unit for detecting a state of charge of a drive battery; and
  a switching control unit that, on the basis of the traveling velocity of the vehicle and the state of charge of the drive battery, selectively switches among
    a first traveling mode in which a clutch, which connects and disconnects driving force transmitted from the engine to the drive wheels, is released and the engine is deactivated and in which the drive wheels are actuated by activating a drive motor by use of the electric power supplied from the drive battery,
    a second traveling mode in which the clutch is released, in which the generator is actuated by the engine to generate electric power, and in which the drive motor is activated by the electric power to actuate the drive wheels, and
    a third traveling mode in which the clutch is connected and in which the drive wheels are actuated by the engine,
  wherein the switching control unit performs
    switching between the second traveling mode and the third traveling mode at a first velocity when the state of charge is less than a first state of charge, and
    switching between the first traveling mode and the third traveling mode at a predetermined velocity which is higher than the first velocity when the state of charge is the first state of charge or more.

The traveling mode switching controller of a hybrid electric vehicle may further comprise request output detection unit for detecting a request output that is required of the vehicle, wherein
  the switching control unit performs, when the state of charge is higher than the first state of charge,
    switching between the second traveling mode and the third traveling mode at a second velocity which is higher than the first velocity on occasion when the request output is a predetermined request output or more, and
    switching between the first traveling mode and the third traveling mode at a third velocity which is higher than the second velocity on occasion when the request output is less than the predetermined request output.

The traveling mode switching controller of a hybrid electric vehicle may be configured such that the switching control unit performs switching between the second traveling mode and the third traveling mode at the third velocity when the state of charge is less than a second state of charge which is lower than the first state of charge.

DETAILED DESCRIPTION OF EXEMPLIFIED EMBODIMENTS

An embodiment of the invention is hereunder described by reference to the drawings.

Figure 1:
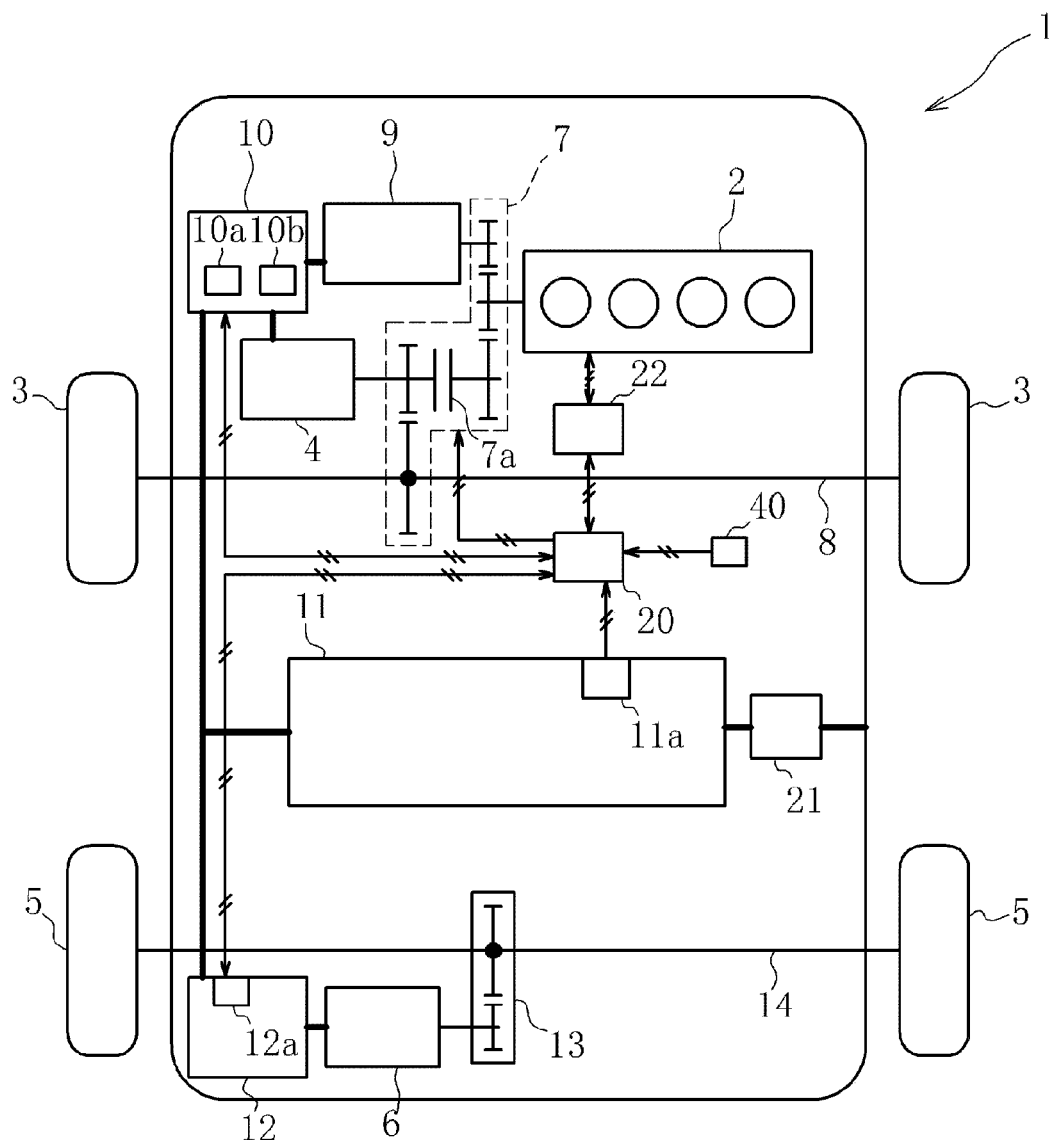
FIG. 1 is a diagrammatic layout chart of a plug-in hybrid electric vehicle of an embodiment of the invention.

FIG. 1 is a diagrammatic layout chart of a plug-in hybrid electric vehicle (hereinafter called a "vehicle 1") of an embodiment of the invention.

The vehicle 1 of the embodiment is a four-wheel-drive vehicle that can travel by actuating front wheels 3 by means of an output from an engine 2 and that is outfitted with a front electric motor 4 (a drive motor) for actuating the front wheels 3 and a rear electric motor 6 (a drive motor) for actuating rear wheels 5.

The engine 2 can actuate a drive shaft 8 of the front wheels 3 by way of a speed reducer 7 and also generate electricity by activating a generator 9 by way of the speed reducer 7.

Supplied with high voltage electric power from a drive battery 11 mounted in the vehicle 1 and the generator 9 by way of a front inverter 10, the front motor 4 is activated to thus actuate the drive shaft 8 of the front wheels 3 by way of the speed reducer 7. The speed reducer 7 has a built-in clutch 7a that can switch between connection and disconnection of power transmission between an output shaft of the engine 2 and the drive shaft 8 of the front wheels 3.

Supplied with high voltage electric power from the drive battery 11 and the generator 9 by way of the rear inverter 12, the rear motor 6 is activated to thus actuate a drive shaft 14 of rear wheels 5 by way of a speed reducer 13.

Electric power generated by the generator 9 can be used for supplying electric power to the front motor 4 and the rear motor 6 as well as for recharging the drive battery 11 by way of the front inverter 10.

The drive battery 11 has an unillustrated battery module which is made up of a secondary battery, like a lithium ion battery, and in which a plurality of battery cells are tied by a bundle. In addition, the drive battery 11 is outfitted with a battery monitoring unit 11a (including state-of-charge detection unit) for monitoring a temperature and a state of charge (hereinafter abbreviated as "SOC") of the battery module. The battery monitoring unit also has a function of calculating electric power W, which the drive battery 11 can accept, from a temperature, a state of charge, a usage status. The usage status may also be an integrated value of input and output electric currents. The acceptable electric power W is electric power that can be input to the drive battery 11 for recharging purpose, and decreases at a low temperature. Further, when the SOC approaches a vicinity of a fully-recharged state, the acceptable electric power W decreases. In addition, the acceptable electric power W also decreases even for reasons of deterioration that takes place concomitantly with elapsing of a time since the battery was used.

The front inverter 10 has a front motor control unit 10a and a generator control unit 10b. The front motor control unit 10a controls an output of the front motor 4 in accordance with a control signal from a hybrid control unit 20. The hybrid control unit 20 includes switching control unit and driver request output detection unit. The generator control unit 10b has a function of controlling a quantity of electricity generated by the generator 9 in accordance with a control signal from the hybrid control unit 20.

The rear inverter 12 has a rear motor control unit 12a. The rear motor control unit 12a has a function of controlling an output of the rear motor 6 in accordance with a control signal from the hybrid control unit 20.

The vehicle 1 is also outfitted with a battery charger 21 that charges the drive battery 11 with an external power supply.

The hybrid control unit 20 is a controller for comprehensively controlling the vehicle 1 and includes an input/output device, a memory device, a central arithmetic processing unit (CPU), a timer, and others. The memory device may also be ROM, RAM, nonvolatile RAM, or the like.

A battery monitoring unit 11a of the drive battery 11, the front motor control unit 10a and the generator control unit 10b of the front inverter 10, the rear motor control unit 12a of the rear inverter 12, an engine control unit 22 for controlling operation of the engine 2, and an accelerator position sensor 40 for detecting an amount of operation of the accelerator pedal are connected to an input side of the hybrid control unit 20. Pieces of detection and activation information output from these units are input to the hybrid control unit 20. Information detected by velocity detection unit that detects a vehicle velocity is also transmitted to the hybrid control unit 20.

In the meantime, the front motor control unit 10a and the generator control unit 10b of the front inverter 10, the rear motor control unit 12a of the rear inverter 12, the speed reducer 7 having the clutch 7a, and the engine control unit 22 are connected to an output side of the hybrid control unit 20.

The hybrid control unit 20 computes a request output P, which is necessary to activate and cause the vehicle 1 to travel, from the various pieces of detection and activation information and transmits control signals to the engine control unit 22, the front motor control unit 10a, the generator control unit 10b, the rear motor control unit 12a, and the speed reducer 7, thereby switching the traveling mode and controlling an output from the engine 4, an output from the front motor 9 and an output from the rear motor 11, and a quantity of electricity generated by the generator 9. The traveling mode includes the EV mode (an electric vehicle mode), the series mode, and the parallel mode.

In the EV mode (a first traveling mode), the clutch 7a of the speed reducer 7 is released, and the engine 2 is stopped. The front motor 4 and the rear motor 6 are activated by unit of the electric power supplied from the drive battery 11, to thus cause the vehicle to travel.

In the series mode (a second traveling mode), the clutch 7a of the speed reducer 7 is released, and the engine 2 drives the generator 9. The front motor 4 and the rear motor 6 are activated by use of the electric power generated by the generator 9 and the electric power supplied from the drive battery 11, thereby causing the vehicle to travel. In addition, in the series mode, a rotating speed of the engine 2 is maintained at high efficiency; namely, in a range of superior fuel consumption, and the electric power generated by an excessive output is supplied to the drive battery 11, thereby recharging the drive battery 11.

In the parallel mode (a third traveling mode), the clutch 7a of the speed reducer 7 is connected to thus mechanically transmit driving power from the engine 2 by way of the speed reducer 7 and actuate the front wheels 3. In addition, the front motor 4 and the rear motor 6 are activated by the electric power that is generated as a result of the generator 9 being activated by the engine 2 and the electric power supplied from the drive battery 11, thereby causing the vehicle to travel.

The hybrid control unit 20 performs switching of the traveling mode on the basis of the SOC of the drive battery 11, the request output P, the traveling velocity V, and the acceptable electric power W.

Switching between the EV mode and the series mode takes place on the basis of the request output P calculated from the amount of operation of an accelerator pedal and the SOC of the drive battery 11. For instance, when the request output P is high, the traveling mode is switched to the series mode. When the request output P is low and when the SOC is high, the traveling mode is switched to the mode EV mode. When both the request output P and the SOC are low, the traveling mode is switched to the series mode.

Switching between the parallel mode and another mode (the series mode and the EV mode) takes place on the basis of a vehicle velocity Vn, the SOC of the drive battery 11, and the acceptable power W. To be specific, when an actual vehicle velocity V is equal to the switching vehicle velocity Vn, which is set on the basis of the SOC of the drive battery 11 and the acceptable electric power W, or more, setting the parallel mode is performed. By contrast, when the actual vehicle velocity V is less than the switching vehicle velocity Vn, another mode (the series mode and the EV mode) is set.

Figure 2:
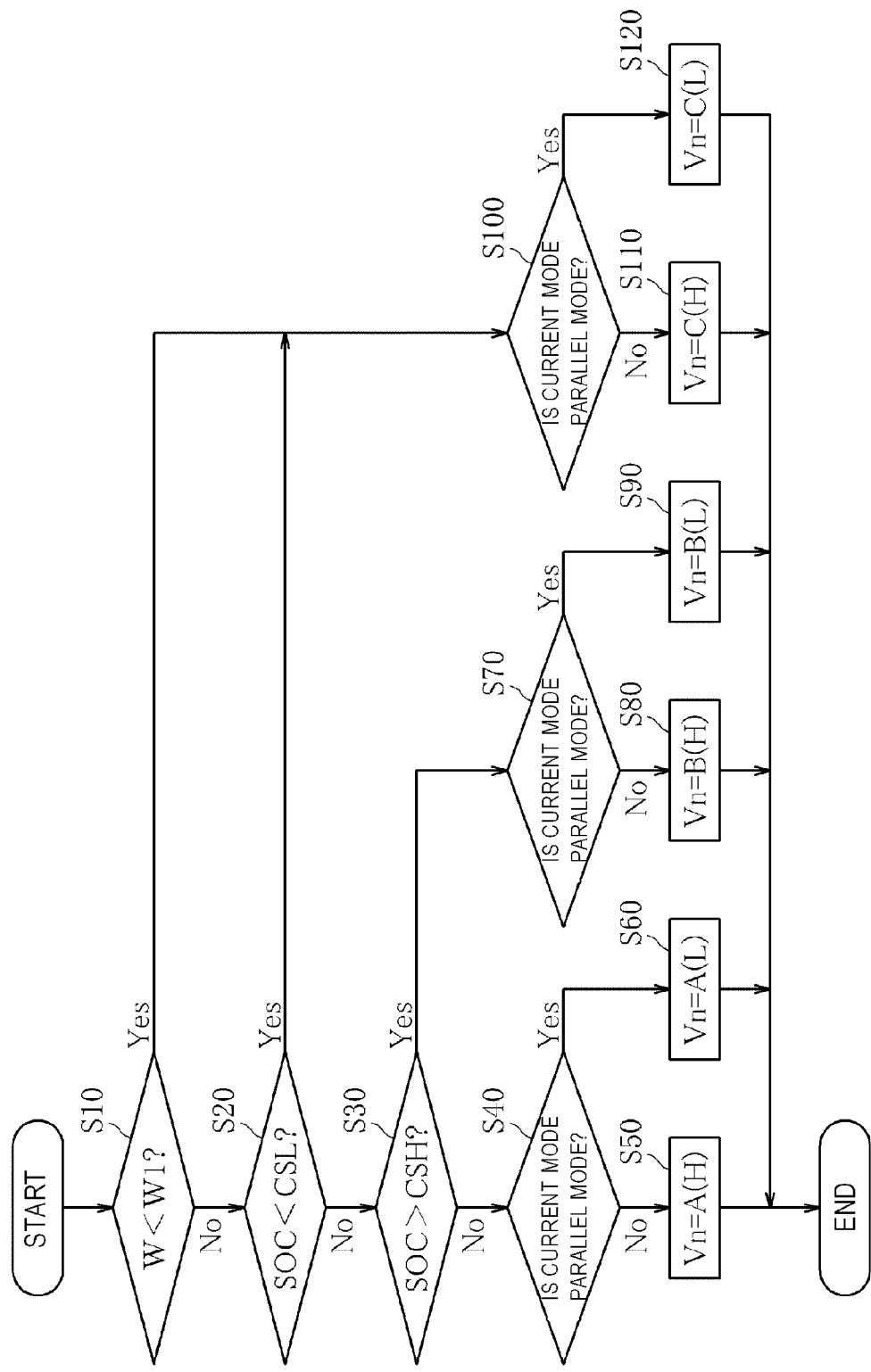
FIG. 2 is a flowchart showing procedures along which a hybrid control unit of the embodiment sets a switching vehicle velocity.

FIG. 2 is a flowchart showing procedures along which the hybrid control unit 20 sets the switching vehicle velocity Vn.

This routine is iterated at predetermined periods when the power of the vehicle 1 is activated.

First, in step S10, the electric power W that the drive battery 11 can accept is input to the hybrid control unit 20 from the battery monitoring unit 11a, and a determination is made as to whether or not the acceptable electric power W is less than a predetermined value W1. The only requirement is to set the predetermined value W1 to; for instance, a value that enables recharging of the drive battery 11 with little waste in the parallel mode. When the acceptable electric power W is less than the predetermined value W1; namely, when the acceptable electric power W is the predetermined value W1 or more, the routine proceeds to step S20.

In step S20, the SOC of the drive battery 11 is input to the hybrid control unit 20 from the battery monitoring unit 11a, and a determination is made as to whether or not the SOC is less than a first threshold value CSL (a second SOC). The first threshold value CSL is set to; for instance, a lower limit value SOC CSL of an allowable domain of the SOC of the drive battery 11. When the SOC is not less than the first threshold value CSL; namely, when the SOC is the first threshold value CSL or more, the routine proceeds to step S30.

In step S30, a determination is made as to whether or not the SOC input in step S20 is higher than a second threshold value CSH (a first state of charge). The second threshold value CSH is a value that is slightly higher than the first threshold value CSL. For instance, the second threshold value CSH is set to a target value SOC CSH employed on the occasion of maintaining the SOC in the course of a hybrid travel being performed in the parallel mode or the series mode. In this regard, a range between the first threshold value CSL and the second threshold value CSH corresponds to a target maintenance range for the SOC of the drive battery 11 during the hybrid travel. When the SOC is not higher than the first threshold value CSL; namely, when the SOC is the first threshold value CSL or less, the routine proceeds to step S40.

In step S40, a determination is made as to whether or not the traveling mode is currently set to the parallel mode. When the current traveling mode is not set to the parallel mode, the routine proceeds to step S50. When the traveling mode is currently set to the parallel mode, the routine proceeds to step S60.

In step S50, the switching vehicle velocity Vn for causing a switch to the parallel mode is set to a preset vehicle velocity A(H) (a first velocity). In this regard, however, the preset vehicle velocity A(H) can be set to; for instance, 65 km/h. The routine now ends.

In step S60, the switching vehicle velocity Vn switching the parallel mode to another mode is set to the preset vehicle velocity A(H). The essential requirement is that the preset vehicle velocity A(L) be set to a value which is slightly lower than the preset vehicle velocity A(H); for instance, to 60 km/h. The routine ends.

When the SOC is determined to be higher than the second threshold value CSH in step S30, the routine proceeds to step S70.

In step S70, a determination is made as to whether or not the traveling mode is currently set to the parallel mode. When the current traveling mode is not set to the parallel mode, the routine proceeds to step S80. When the traveling mode is currently set to the parallel mode, the routine proceeds to step S90.

In step S80, the switching vehicle velocity Vn for causing a switch to the parallel mode is set to a preset vehicle velocity B(H) (a second velocity). In this regard, a preset vehicle velocity B(H) is a value that is higher than the preset vehicle velocity A(H). The essential requirement is to set the preset vehicle velocity B(H) to; for instance, 110 km/h. The routine ends.

In step S90, the switching vehicle velocity Vn for switching the parallel mode to another mode is set to the preset vehicle velocity B(L). In this regard, the only requirement is to set a preset vehicle velocity B(L) to a value that is slightly lower than the preset vehicle velocity B(H); for instance, 105 km/h. The routine ends.

When the acceptable electric power W is determined to be less than the predetermined value W1 in step S10 or when the SOC is determined to be less than the first threshold value CSL in step S20, the routine proceeds to step S100.

In step S100, a determination is made as to whether or not the traveling mode is currently set to the parallel mode. When the current traveling mode is not set to the parallel mode, the routine proceeds to step S110. When the traveling mode is currently set to the parallel mode, the routine proceeds to step S120.

In step S110, the switching vehicle velocity Vn for causing a switch to the parallel mode is set to a preset vehicle velocity C(H) (a third velocity). In this regard, a preset vehicle velocity C(H) can be a value that is higher than the preset vehicle velocity B(H). The essential requirement is to set the preset vehicle velocity C(H) to a value that is not substantially attained; for instance, 150 km/h. The routine ends.

In step S120, the switching vehicle velocity Vn for causing a switch from the parallel mode to another mode is set to a preset vehicle velocity C(L). The only requirement is to set the preset vehicle velocity C(L) to a value that is slightly lower than the preset vehicle velocity C(H); for instance, 145 km/h. The routine ends.

Figure 3:
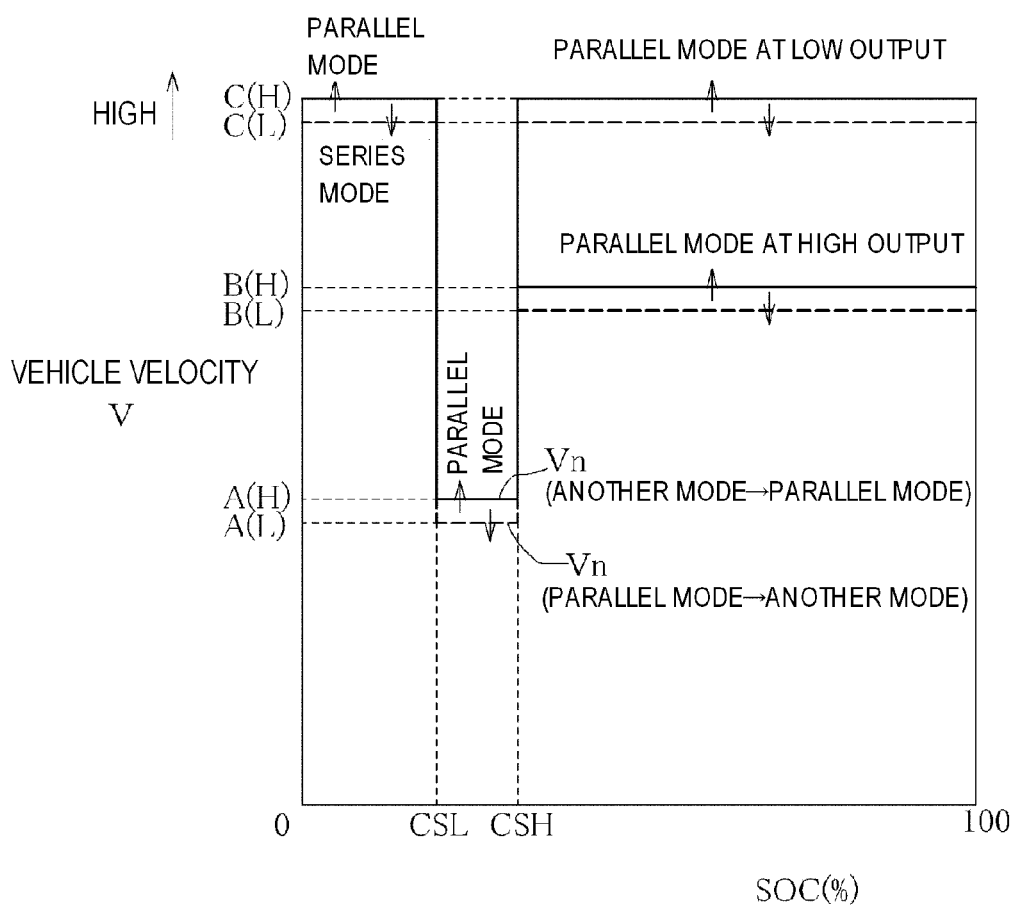
FIG. 3 is a map showing a setting status of parallel mode switching in the embodiment.

FIG. 3 is a map showing a setting status of parallel mode switching. A thick, solid line shown in FIG. 3 designates a switching vehicle velocity Vn for switching a traveling mode other than the parallel mode to the parallel mode, and a thick, broken line shown denotes a switching vehicle velocity Vn for switching the parallel mode to another traveling mode.

The switching vehicle velocity Vn for causing a switch to the parallel mode is set as illustrated by the flowchart shown in FIG. 2, whereby switching between the parallel mode and another traveling mode is minutely changed on the basis of the vehicle velocity V and the SOC.

When the current traveling mode is not the parallel mode; namely, when the SOC falls within a range from the first threshold value CSL to the second threshold value CSH, the lowest preset vehicle velocity among the preset vehicle velocities A(H), B(H), and C(H) is selected for the switching vehicle velocity Vn for switching the series mode (or the EV mode) to the parallel mode.

When the SOC falls in a range which is lower than the target value SOC CSH within the allowable domain, the switching vehicle velocity Vn is set to the preset vehicle velocity A(H) that is a comparatively low value. Accordingly, a low vehicle velocity is switched to the parallel mode. In the parallel mode, a portion of driving force of the engine 2 is mechanically transmitted to the drive shaft 8. Therefore, the parallel mode is superior, in transmission efficiency, to the series mode in which all of the driving force of the engine 2 is transmitted to the drive shafts 8 and 14 by way of the generator 9 and drive motors (the front motor 4 and the rear motor 6). Further, the drive motors (the front motor 4 and the rear motor 6) consume less electric power in the parallel mode than in the series mode. Therefore, the SOC of the drive battery 11 becomes less likely to fall and can be prevented from falling below the allowable domain (i.e., the first threshold value CSL).

When the SOC is higher than the second threshold value CSH, the switching vehicle velocity Vn is set to the preset vehicle velocity B(H) that is higher than the preset vehicle velocity A(H).

When the SOC falls in a range that is higher than the target value SOC CSH, the switching vehicle velocity Vn is thereby set to a comparatively high value; hence, a switch to the parallel mode does not take place until a high vehicle velocity is attained. As a consequence, a chance of the traveling mode being set to another mode, in particular, the EV mode, grows, which in turn allows enhancement of fuel consumption.

In addition, when the SOC falls in a range that is higher than the target value SOC CSH and when the request output P is less than a predetermined request output that can be output in the EV mode, the switching vehicle velocity Vn is set to the highest preset vehicle velocity C(H). The chance of the traveling mode being set to the EV mode thereby further grows, which allows an additional improvement in fuel consumption. Moreover, when the request output P is more than a predetermined request output; namely, when an output becomes deficient in the EV mode, the switching vehicle velocity Vn is set to the preset vehicle velocity B(H) as mentioned above. When the vehicle velocity V is the switching vehicle velocity Vn (the preset vehicle velocity B(H)) or more, the parallel mode is selected. In contrast, when the vehicle velocity V is less than the switching vehicle velocity Vn (the preset vehicle velocity B(H)), the series mode is selected. During a period of high output in which an output becomes deficient in the EV mode, selecting either the parallel mode or the series mode is required. In the meantime, when a switch to the parallel mode is performed at a low vehicle velocity, the rotating speed of the engine 2 falls. Accordingly, the engine 2 is activated in a low-efficiency range, so that a fuel consumption rate increases, which may deteriorate fuel consumption. In light of this, the series mode is selected, in the embodiment, at a low vehicle speed that is lower than the preset vehicle velocity B(H), whereby the rotating speed of the engine 2 can be maintained at high efficiency; namely, in a range of low fuel consumption rate, and fuel consumption can be improved. In the meantime, when the vehicle is at high speed that is the preset vehicle velocity B(H) or more, the rotating speed of the engine 2 can be maintained within the range of high efficiency even when the parallel mode is selected. Hence, fuel consumption can be improved by setting the traveling mode to the parallel mode that exhibits superior transmission efficiency enables enhancement of fuel consumption.

Moreover, when the SOC is less than the second threshold value CSL, the preset vehicle velocity C(H) that is the fastest among the preset vehicle velocities A(H), B(H), and C(H) is selected.

As a result, when the SOC is less than the second threshold value CSL, the traveling mode is not set to the parallel mode until the vehicle velocity V increases to the preset vehicle velocity C(H) set for the switching vehicle velocity Vn. As mentioned above, since the preset vehicle velocity C(H) is; for instance, 150 km/h, a switch to the parallel mode is substantially regulated. The SOC has fallen below the allowable domain (the second threshold value CSL) at this time, and hence the traveling mode is set to the series mode. Since the clutch 7a is connected in the parallel mode, limits are imposed on both the rotating speed of the engine 2 and a quantity of electricity generated by the generator 9. By contrast, since the clutch 7a is not connected in the series mode, the rotating speed of the engine 2 can be freely set. For this reason, the quantity of electricity generated can be increased by increasing the rotating speed of the engine 2, and hence a quantity of electricity for recharging the drive battery 11 can be quickly increased.

When a current traveling mode is the parallel mode; namely, when the switching vehicle velocity Vn at which the parallel mode is switched to another traveling mode (the series mode or the EV mode), is changed on the basis of the vehicle velocity V and the SOC in the same way as the vehicle velocity Vn at which the other traveling mode (the series mode and the EV mode) is switched to the parallel mode. However, both vehicle velocities are set lower by about 5 km/h, respectively. Therefore, an advantage similar to that yielded when the other traveling mode (the series mode or the EV mode) is switched to the parallel mode is yielded, and occurrence of hunting, which would otherwise occur at the time of switching of the traveling mode, can be prevented.

Moreover, as indicated by step S10 shown in FIG. 2, the switching vehicle velocity Vn is set to the fastest vehicle velocity C(H) under an anomalous condition, like a situation in which the acceptable electric power W of the drive battery 11 stays low. The parallel mode is thereby substantially regulated. The reason for this is that, for instance, when the drive battery 11 is at a low temperature or deteriorated, the electric power required to actuate the clutch 7a in order to cause a switch to the parallel mode may become deficient. In addition, when the drive battery 11 remains fully recharged, the drive battery 11 can not be recharged any further. Accordingly, inhibition of unwanted power generation and protection of the drive battery 11 can be achieved by causing a switching to the EV mode to thus deactivate the engine 2 or a switch to the series mode to thus decrease the rotating speed of the engine 2 and the quantity of electricity generated by the generator 9. Moreover, when a switch to the parallel mode takes place, regulating the rotating speed of the engine 2; for instance, is commonly practiced so as to synchronize a rotating speed achieved before the clutch 7a to the rotating speed achieved after the clutch 7a in order to prevent occurrence of a variation in the rotating speed on the occasion of connection of the clutch 7a. However, in a fully recharged state, even when the rotating speed of the engine 2 is increased by regulation and when the quantity of electricity generated by the generator 9 is resultantly increased, there is no room for accepting the thus-generated electric power. However, such wasteful power generation can be prevented by limiting the switch to the parallel mode.

As above, in the embodiment, switching between the parallel mode and another mode is performed on the basis of the vehicle velocity V and the SOC of the drive battery 11. In particular, the switching vehicle velocity Vn for causing a switch to the parallel mode is minutely set on the basis of the SOC, whereby fuel consumption is enhanced. Also, the SOC of the battery can be maintained in the target maintenance range (the range from the first threshold value CSL to the second threshold value CSH). Further, even under anomalous conditions in which the drive battery 11 cannot fully accept electric power, circumventing wasteful power generation and protecting the drive battery 11 can be implemented by limiting a switch to the parallel mode.

As above, the traveling mode switching controller of the hybrid electric vehicle of the invention performs switching between the second traveling mode and the third traveling mode at a first velocity when the SOC of the battery is less than a predetermined SOC. When the SOC is the predetermined SOC or more, switching between the first traveling mode and the third traveling mode is performed at a velocity that is higher than the first velocity. When the traveling velocity is high, the third traveling mode is selected. Thereby, when the SOC of the battery is less than the predetermined SOC, the third traveling mode is selected at a low velocity, so that a chance of selecting the third traveling mode can be increased. Therefore, fuel consumption can be improved by efficient transmission of driving force, and electric power consumed by the drive motors is lessened, whereby a decrease in SOC of the drive battery can be prevented. In addition, when the SOC of the battery is the predetermined SOC or higher, switching takes place at a higher traveling velocity when compared with a case where the SOC of the battery is less than a predetermined SOC. Accordingly, the chance of selecting the third traveling mode is prevented, and a chance of selecting the first traveling mode is increased, whereby fuel consumption can be lessened.

In a case where the SOC of the battery is higher than the predetermined SOC, switching between the second traveling mode and the third traveling mode takes place at a second velocity that is higher than the first velocity when a request output is a predetermined request output or more. Accordingly, the third traveling mode is selected for a high speed travel, thereby inhibiting a switch to the third traveling mode at a low speed and holding the engine at efficient high rotation, whereby the drive wheels can be efficiently actuated by the engine. Further, when the request output is less than the predetermined request output, switching between the first traveling mode and the third traveling mode takes place at a third velocity that is higher than the second velocity. Hence, the first traveling mode is selected for a low travel speed, whereby the chance of selecting the first traveling mode is increased and whereby fuel consumption can be improved.

When the SOC of the battery is less than the second SOC, switching between the second traveling mode and the third traveling mode takes place at a third velocity that is higher than the first velocity and the second velocity. Accordingly, the second traveling mode is selected for the low speed, whereby a chance of selecting the second traveling mode increases, to thus set the rotating speed of the engine to a high speed. The quantity of electricity generated by the generator is thus increased, whereby the SOC of the battery can be quickly recovered.

Incidentally, the invention is not limited the foregoing embodiment. For instance, numerals of the preset values [A(H), A(L), B(H), B(L), C(H), and C(L)] of the respective switching vehicle velocities Vn and numerals of the threshold values for the SOC (the first threshold value CSL and the second threshold value CSH) can be changed accordingly, so long as the numerals exhibit the same order of magnitude.

Moreover, although, in the embodiment, the invention is applied to the four-wheel-drive plug-in hybrid electric vehicle, the invention can be widely applied to hybrid electric vehicles that can perform switching among; at least, the EV mode, the series mode, and the parallel mode.

What is claimed is:

1. A traveling mode switching controller of a hybrid electric vehicle with a pair of drive wheels, comprising:
    a velocity detection unit for detecting a traveling velocity of the vehicle;
    a state-of-charge detection unit for detecting a state of charge of a drive battery that supplies electric power to an electric motor of the vehicle; and
    a switching control unit that, on the basis of the traveling velocity of the vehicle and the state of charge of the drive battery, selectively switches among:
        a first traveling mode in which a clutch, which connects and disconnects driving force transmitted from an engine of the vehicle to the drive wheels, is released and the engine is deactivated and in which the drive wheels are actuated by activating the electric drive motor by use of the electric power supplied from the drive battery,
        a second traveling mode in which the clutch is released, in which the generator is actuated by the engine to generate electric power, and in which the electric drive motor is activated by the electric power supplied from a generator to actuate the drive wheels, and
        a third traveling mode in which the clutch is connected and in which the drive wheels are actuated by the engine, and the generator is actuated by the engine to generate electric power, and in which the electric motor is activated by the electric power supplied from the generator to actuate the drive wheels,
    wherein the switching control unit performs
        switching from the second traveling mode to the third traveling mode at a first velocity when the state of charge is less than a first state of charge, and
    wherein the traveling mode switching controller further comprises:
    a request output detection unit that detects a request output that is required of the vehicle based on a depression amount of an accelerator pedal, and
    wherein the switching control unit performs, when the state of charge is equal to or higher than the first state of charge;
        switching from the second traveling mode to the third traveling mode at a second velocity which is higher than the first velocity when the request output is a predetermined request output or more, and
        switching from the first traveling mode to the third traveling mode at a third velocity which is higher than the second velocity on occasion when the request output is less than the predetermined request output.

2. The traveling mode switching controller of the hybrid electric vehicle according to claim 1,
    wherein the switching control unit performs switching from the second traveling mode to the third traveling mode at the third velocity when the state of charge is less than a second state of charge which is lower than the first state of charge,
    the second state of charge being a lower limit of a target maintenance range for the state of charge of the drive battery during the hybrid travel in the third and second travelling modes.

3. The traveling mode switching controller of the hybrid electric vehicle according to claim 2, wherein the first state of charge is an upper limit of the target maintenance range for the state of charge of the drive battery during the hybrid travel in the third and second travelling modes.

4. The traveling mode switching controller of the hybrid electric vehicle according to claim 1, wherein the first state of charge is a target value for maintaining the state of charge of the drive battery.

5. The traveling mode switching controller of the hybrid electric vehicle according to claim 2, wherein the switching control unit selects the second traveling mode or the third traveling mode in a range between the first state of charge and the second state of charge so as to maintain the state of charge of the drive battery in the target maintenance range.

* * * * *